United States Patent Office 2,938,803
Patented May 31, 1960

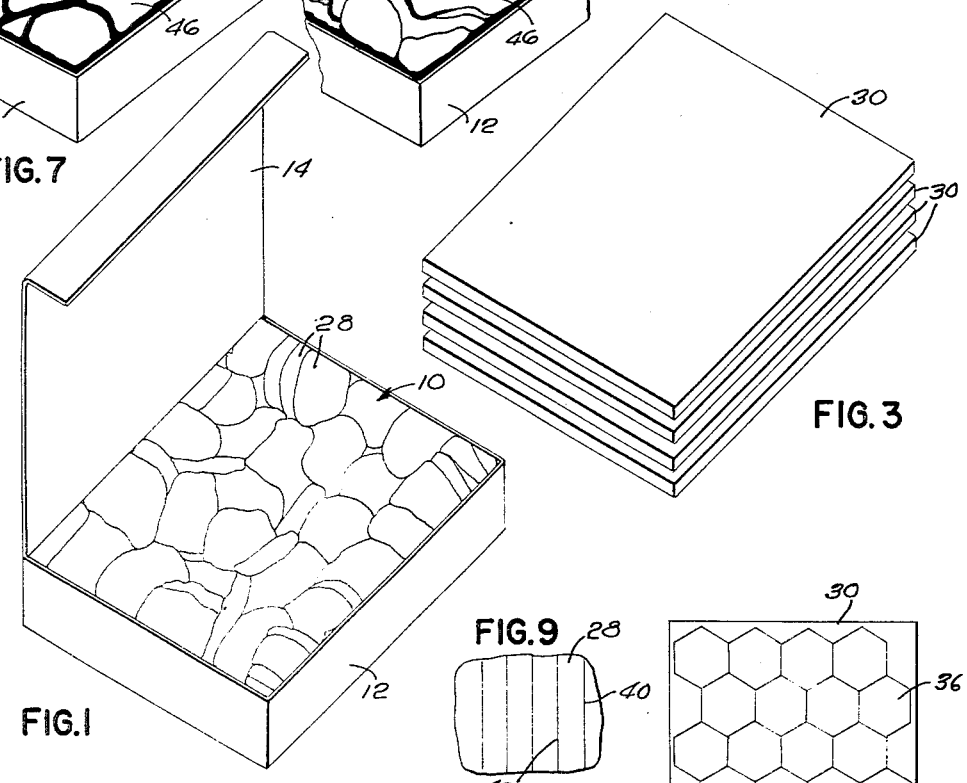

2,938,803
SEAFOOD PRODUCTS AND METHOD OF MAKING THE SAME
Thomas S. Gorton, Jr., 993 Memorial Drive, Cambridge, Mass.
Filed Dec. 4, 1956, Ser. No. 626,189
8 Claims. (Cl. 99—195)

This invention relates to seafood products and to the method of making the same.

The invention has for one object to produce novel seafood products which may be produced in any desired size or shape and in a form which enables the products to be cooked as served with advantage in restaurants and the like.

A further object of the invention is to provide a novel method of making the aforesaid seafood products in an efficient and economical manner.

With these general objects in view and such others as may hereinafter appear, the invention consists in the novel seafood products and in the method of making the same hereinafter described and particularly defined in the claims at the end of this specification.

In the drawings:

Fig. 1 is a perspective view illustrating the seafood packed in a container prior to freezing;

Fig. 2 is an end view partially broken away illustrating the container disposed within freezing plates for freezing the contents of the filled container;

Fig. 3 is a perspective view illustrating the frozen mass sliced to provide relatively thin sheets thereof;

Fig. 4 is a plan view showing the frozen seafood cut to form individual uniform pieces thereof;

Fig. 5 is a view similar to Fig. 4 showing individual cylindrical pieces;

Fig. 6 is a perspective showing three sizes of scallops produced by the cutting operation of Fig. 5;

Fig. 7 is a perspective view illustrating a portion of a container packed with whole pieces of seafood;

Fig. 8 is a perspective view similar to Fig. 7 illustrating whole scallops packed with scallop rims; and Fig. 9 is a side elevation illustrating a piece of seafood sliced to provide individual pieces thereof.

In accordance with the invention a plurality of individual scallops of various sizes are sliced or cut, preferably in a slicing machine, in random slices. The sliced pieces of scallop meat are thereafter packed in a fibrous container and frozen to thereby form a frozen compact solidified mass thereof. The frozen mass may then be sliced to provide a plurality of relatively thin sheets preferably of uniform thickness. The particular thickness of the sheets may vary depending upon the size scallops desired to be produced. Thereafter the individual frozen sheets may be die cut in their laminated relation or may be individually die cut to form a plurality of individual scallops of substantially uniform size and thickness, each made up of a plurality of sliced frozen together components of varying size and shape.

Referring now to the drawings illustrating the preferred embodiment of the invention, 10 represents a mass of sliced individual pieces of scallop meat packed snugly in a fibrous container 12. After the container 12 is compactly filled with the sliced individual pieces of scallop meat the cover 14 is closed and the package placed in a plate froster of the type now being widely used. The sides 16 of the container are supported by side plates 18 of the froster, and the top and bottom surfaces 20, 22 of the container are supported between top and bottom plates 24, 26 of the froster as is clearly shown in Fig. 2. The package thus constrained on all surfaces is now ready for freezing. The sliced individual pieces 28 of scallop meat are then frozen in the container into a compact solid mass. During freezing the snugly packed mass of sliced individual pieces of scallop meat is subjected to expansion which is constrained by the side plates 18 and the top and bottom plates 24 and 26 of the froster, thereby helping to cause the mass of meat to be more firmly compacted and frozen into a solid mass without an increase in bulk. The mass may then be removed from the container.

The next step in the present method consists in slicing the frozen mass to thereby reduce the thickness of the same and to produce a plurality of relatively thin sheets 30 of the frozen mass of scallop meat. Preferably, the thickness of the sheets will be in a range of from about 3/8" to 3/4", depending upon whether or not small or relatively large scallops are to be produced and according to whether they are to be sold in an unbreaded, breaded or fried condition. The sheets 30 may be laminated one upon the other and die cut as a unit, or each individual sheet die cut if desired. In practice the die may comprise a multiple cavity die wherein the mass is cut in one operation to produce a plurality of individual scallops preferably of uniform size and shape. If desired, the die may comprise a plurality of cavities of one size and/or shape or a plurality of cavities of different sizes to thereby produce individual scallops of different sizes and shapes. A die having a single cavity may also be used if desired, and in this manner individual scallops of uniform size may be die cut from the thin frozen sheets. In practice the cutting of the individual scallops from the frozen sheet or sheets may be accomplished in any of a number of ways. For example, a gang die may be used, and the cutting of the entire sheet may take place simultaneously or a smaller die used and the frozen sheet moved with relation thereto. While it is preferred to slice the frozen mass to form sheets 30, individual scallops may be die cut or otherwise cut from the frozen mass after it is removed from the container.

The present scallops may be produced in and desired shape. As shown in Figs. 4, 5 and 6, the individual scallops may be round 32, square 34, hexagonal in cross section 36, or may be in stick form 38. In practice hexagonally shaped scallops are considered to be more merchantable and are preferred.

After the scallops have been die cut from the frozen sheets formed in accordance with the present invention they may be dipped in or covered with batter, breaded and packed for shipment to the consumer. In some instances it may be preferred to dip the scallops and/or scallop meat in a suitable fluid, such as a mixture of flour, egg and powdered milk, prior to packing for freezing in order to assist the scallops and/or scallop meat to firmly adhere together when frozen.

It will be apparent from the foregoing description that the surface area of the individual scallops is greatly increased by the slicing or cutting operation. Each sliced or cut piece of scallop meat is provided with relatively large, flat plane surfaces 40, 42. When the pieces are packed in a container for freezing the flat surfaces enable the corners of the container to be completely filled with meat, and the flat surfaces of each piece firmly adhere to each other to form a compact mass substantially free of moisture and air spaces. The mass is further compacted by expansion during the freezing operation, thereby producing a solid packed mass of scallop meat which when frozen may be die cut and handled thereafter with a minimum of breakage.

The present invention contemplates the use of scallop rims in the production of the frozen blocks above described. Heretofore, scallop rims have been of little or no commercial value. The rim of a medium size scallop is approximately equal in weight to the scallop meat itself. The rims may in some instances be used alone or mixed with scallop meat in practicing the foregoing process. As illustrated in Fig. 8, the rims 44 may be packed in the container together with whole scallops 46, thereby forming a closely packed mass. It is preferred to bleach the rims in water or colored with a suitable dye before they are mixed with the scallop meat in order that the inside of the finished product when broken open will be more attractive in appearance. Scallop rims are long, flat and thin, and therefore assist in causing the components of the final product to adhere firmly together. In addition to the use of scallop rims, the trimmings which result from the die cutting operations heretofore described may also be mixed with the scallop meat to produce the final product. It is also recommended that when the sliced individual pieces of scallop meat, rims or trimmings are being prepared for packing the mass should be drained or otherwise treated to remove as much moisture as is practical in order to facilitate the adherence of the components of the final product.

From the foregoing description it will be apparent that the present invention contemplates the production of scallops simulating in size and appearance natural scallops and other seafood products of any desired uniform size and shape. The present scallops are particularly adapted for restaurant use wherein "portion control" is of the utmost importance. The present scallop product enables portions of uniform size either by count or weight to be rapidly determined before and after cooking and to be served with leftover waste substantially eliminated. Uniformity of size is also of importance when scallops are cooked in a thermostatically controlled deep fat fryer in that the cooking time and temperature can be adjusted so that all of the scallops cooked will be perfectly done when they reach a golden brown color. Bulk quantities of these frozen breaded or prefried scallops may be kept in their frozen state, and only such quantities as may be needed can be easily removed from the freezer for immediate use.

The present invention contemplates other novel seafood products produced in the same manner. For example, haddock fillets laminated with shrimp meat pieces may be packed in a container, frozen and then die cut in the shape of haddock fillets. Another form of seafood product which may be produced comprises a clam block which may be produced by utilizing whole shucked clams or parts thereof, which may be packed, frozen and die cut into any desired shape. Preferably, the clams or parts of the clams are first thinly sliced in order to increase the surface area to facilitate the adhesion thereof into block form and reducing breakage of the die cut product to a minimum during handling before and during cooking. If desired, the slicing operation may be effected when the clams or parts thereof are in a frozen condition, and the sliced frozen product may then be thawed to be refrozen and die cut, as above described, into the final shape desired. The frozen clam block may also be made into a fried clam product or breaded clam stick by slicing the block into thin sheets and then cutting the sheets into sticks, preferably ⅜" thick, ⅞" wide and 3½" long in the manner and shape illustrated in Fig. 4. The sticks may then be battered or breaded while in their frozen state and packed for sale; breaded and frozen; or placed in the fryer while frozen, fried, packed and refrozen.

Thus, it may be seen that the present invention provides seafood products which may be economically and efficiently produced and which are particularly adapted for restaurant use wherein serving quality can be improved, time and labor saved and waste substantially eliminated.

While it is preferred to slice or cut the individual whole scallops or parts thereof, they may be ground or cubed to increase the surface area prior to packing and freezing. The scallops may also be sliced, cut, ground or cubed either in a fresh condition, frozen or defrosted condition, then frozen or refrozen and die cut into the desired sizes and shapes as heretofore described.

While it is preferred to slice the scallops and other seafood prior to packing and freezing, whole scallops may be packed, frozen, and cut into individual pieces of any size or shape as heretofore described and illustrated in Fig. 7.

This invention is a continuation-in-part of my copending application, Serial No. 599,837, filed July 24, 1956, now abandoned.

Having thus described the invention, what is claimed is:

1. The method of making a frozen seafood product which will not break apart during handling and cooking, comprising the steps of: randomly cutting a plurality of individual pieces of seafood selected from the group consisting of scallops and clams into thin slices to provide flat sides thereon to increase the surface area thereof to facilitate adherence of the slices to each other in the final product; compacting the cut slices of seafood into a mass substantially free of air spaces; freezing said mass; cutting said frozen mass into sheets of desired thickness; and then cutting the sheets into individual shapes.

2. A product made in accordance with the method defined in claim 1.

3. The method of making a frozen seafood product which will not break apart during handling and cooking, comprising the steps of: compacting components selected from the group consisting of randomly sliced scallops, randomly sliced clams, and scallop rims, all of which have flat surfaces that facilitate adherence of the components to each other in the final product, into a mass substantially free of air spaces; freezing said mass; cutting the frozen mass into sheets of desired thickness; and then cutting the sheets into individual shapes.

4. A product made in accordance with the method of claim 3.

5. The method of making a frozen seafood product, as defined in claim 3, in which the scallop rims are bleached prior to freezing.

6. The method of making a seafood product which will not break apart during handling and cooking, comprising the steps of: randomly cutting a plurality of individual pieces of seafood selected from the group consisting of scallops and clams into thin slices to provide flat sides thereon to increase the surface area thereof to facilitate adherence of the slices to each other in the final product; compacting said slices into a mass substantially free of air spaces; freezing said mass while constraining said mass against expansion to further compact the same; cutting said frozen mass into sheets of desired thickness; and then cutting the sheets into individual shapes.

7. A product made in accordance with the method of claim 6.

8. The method of making a frozen seafood product which will not break apart during handling and cooking, comprising the steps of: forming a mass of seafood of components selected from the group consisting of scallops and clams; freezing said mass of seafood; cutting said frozen mass of seafood into thin slices; allowing the sliced seafood to thaw and compacting it in a container to form a mass substantially free of air spaces; freezing the mass of sliced seafood in said container; cutting said mass of frozen sliced seafood into sheets of desired thickness; and then cutting the sheets into individual shapes.

References Cited in the file of this patent

UNITED STATES PATENTS

| | | |
|---|---|---|
| 1,864,285 | Taylor | June 21, 1932 |
| 1,983,768 | Norton | Dec. 11, 1934 |
| 2,716,608 | Renish | Aug. 30, 1955 |
| 2,724,651 | Hampton et al. | Nov. 22, 1955 |

OTHER REFERENCES

Quick Frozen Foods, December 1954, p. 58.